Nov. 23, 1965   R. L. HAND, JR   3,220,010
AZIMUTH-ELEVATION PLOTTER
Filed Feb. 18, 1963   2 Sheets-Sheet 1
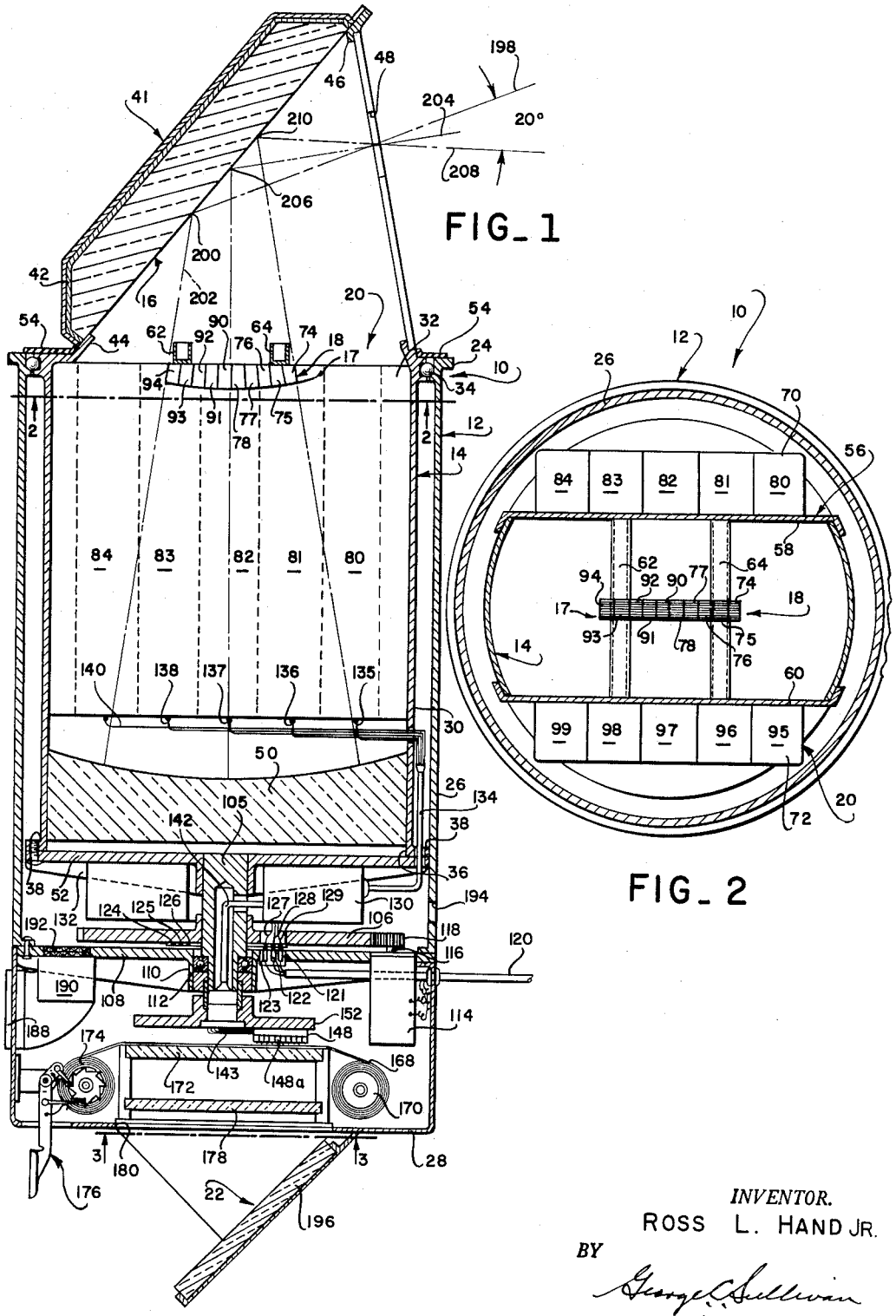
FIG_1
FIG_2
INVENTOR.
ROSS L. HAND JR.
BY
George C. Sullivan
Agent Nov. 23, 1965   R. L. HAND, JR   3,220,010
AZIMUTH-ELEVATION PLOTTER
Filed Feb. 18, 1963   2 Sheets-Sheet 2

INVENTOR.
ROSS L. HAND JR.
BY George C. Sullivan
Agent

United States Patent Office 3,220,010
Patented Nov. 23, 1965

3,220,010
AZIMUTH-ELEVATION PLOTTER
Ross L. Hand, Jr., Sun Valley, Calif., assignor to Lockheed
Aircraft Corporation, Burbank, Calif.
Filed Feb. 18, 1963, Ser. No. 259,148
5 Claims. (Cl. 346—33)

This invention relates to an azimuth-elevation plotter and more particularly to such a plotter which is an integral part of an infrared search device.

Infrared search devices typical of the prior art include a diagonal mirror which is rotatable through 360° in azimuth and which may be adjusted to receive target energy over a limited range in elevation from different elevational sectors. The target energy is reflected by the diagonal mirror throuh a reticle onto an array of infrared detectors. If the target energy originates from near the top of a particular elevational sector, it will be reflected through the reticle near one edge thereof. If the target energy is received from near the center of the elevational sector, it will be reflected through the center of the reticle. If the target energy is reflected from near the lower end of the elevational sector, it will be reflected through the other edge of the reticle. A number of infrared detectors comprising the array are positioned with respect to the reticle in such a manner that each one receives reflected target energy only from a predetermined section of the reticle and will, therefore, give an indication of the elevation of the target radiating the energy. With this system, the angular resolution in elevation is determined by the total elevational field divided by the number of cells employed. A separate amplifier is required for each detector cell and each amplifier is connected in an electrical circuit to a remote display system which is located adjacent the infrared search device and which converts a signal from a particular cell to an elevational reading. The remote display system also includes suitable instruments for giving an indication of the location of the target energy in azimuth. Since the target energy is being received by a diagonal mirror which is rotating through 360° in azimuth, slip rings must be employed to connect the detector cells and the azimuth resolution equipment with the remote display unit.

Slip rings, while generally satisfactory, do have certain drawbacks. One drawback resides in the fact that they add to the cost of manufacturing a search device. Another drawback resides in the fact that they require frequent maintenance to maintain a clean, positive electrical contact. Yet another drawback resides in the fact that a sliding contact generates static which interferes with the signals from the amplifiers. In addition, synchronizers must be employed between the remote display unit and the search device to synchronize the signals received.

In view of the foregoing factors and conditions characteristic of infrared search devices which employ remote display units, it is a primary object of the present invention to provide a new and improved infrared search device not subject to the disadvantages enumerated above and having azimuth and elevation plotting equipment which is an integral part of the device.

Another object of the present invention is to provide an infrared search device having an integral display unit capable of tracking a plurality of targets.

Yet another object of the present invention is to provide a device of the type described having improved target tracking capabilities.

Still another object of the present invention is to provide an infrared search device having an integral display unit with multiple channel capabilities.

A further object of the present invention is to provide an infrared search device having improved angular resolution and accuracy.

A still further object of the present invention is to provide an infrared search device which eliminates slip rings between the infrared detector cell amplifiers and the readout or display equipment.

Another object of the present invention is to provide an infrared search device which eliminates synchronizers between a display unit and the search head.

Another object of the present invention is to provide an infrared search device having an integral display unit which records and makes a permanent record of azimuth and elevation findings.

In accordance with the present invention, an arm is connected directly to the rotating infrared search device in such a manner that it rotates therewith. A suitable stylus is connected to the arm for each detector cell and amplifier output. Each stylus is connected with an amplifier in such a manner that, whenever target energy causes a signal to be generated the stylus makes a mark on a suitable material mounted subjacent the rotatable arm. Each stylus is positioned radially along the arm in such a manner that its distance from the center of rotation of the arm corresponds to the location of a particular detector cell with respect to the reticle. Since, as pointed out above, the elevation of target energy received by each cell is determinable by the location of the cell with respect to the reticle, each stylus represents a particular target elevation corresponding to its radial distance along the arm. Since the arm is rotating with the search device, and since target energy is received through an apertured head on the search device, a particular mark will be located on the material at the then angle in azimuth of the target. Subsequent marks show the target movement relative to the search device. The features of the present invention which are believed to be novel are set forth with particularity in the appended claims.

The present invention, both as to its organization and manner of operation, together with further objects and advantages thereof, may best be understood by reference to the following description, taken in connection with the accompanying drawings, in which:

FIGURE 1 is a vertical, cross-sectional view, with parts shown in elevation, of an infrared search device of the present invention;

FIGURE 2 is a transverse, cross-sectional view, taken along line 2—2 of FIGURE 1;

Figure 3:
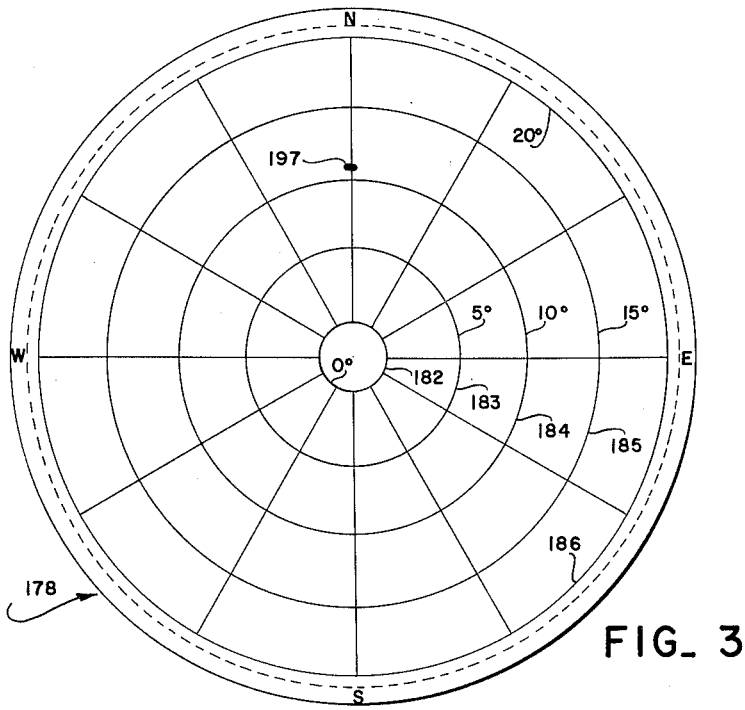
FIGURE 3 is an enlarged elevational view taken in the direction of arrows 3—3 of FIGURE 1 showing a graduated window in the search device.
Figure 4:
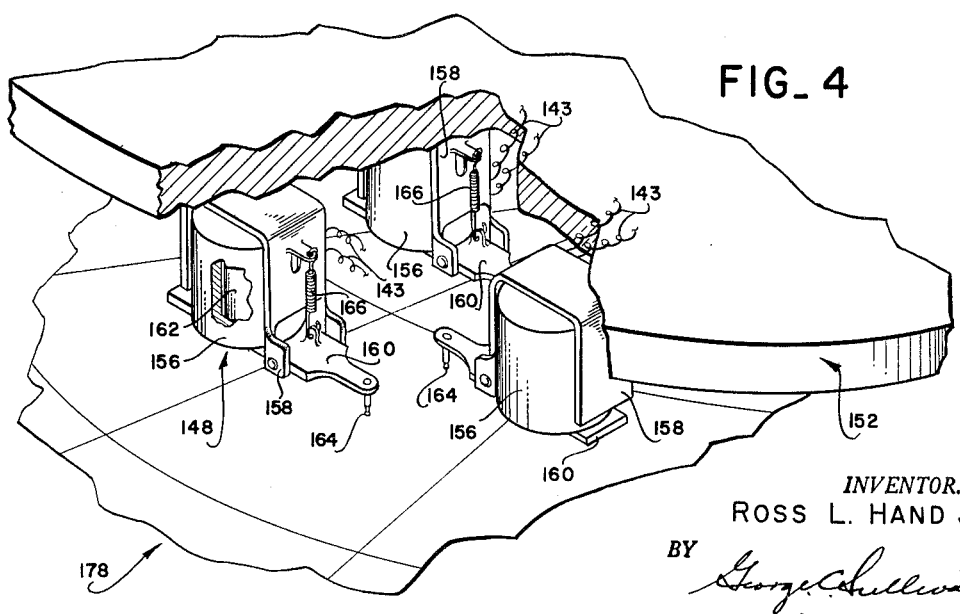
FIGURE 4 is an enlarged perspective view of a portion of the styli of FIGURE 1.

Referring again to the drawings, the infrared search device of the present invention, generally designated 10, includes, generally, a fixed cylindrical housing 12, a rotatable housing 14, a diagonal mirror 16, a reticle 17, an array of infrared detector cells 18, a plurality of amplifiers 20 and a readout system 22.

The fixed housing 12 has an open, flanged top 24, an encompassing sidewall 26 and a bottom wall 28.

The rotatable housing 14 includes an encompassing sidewall 30, an open top 32, which is surrounded by an annular bearing race 34 and an open bottom 36, which is surrounded by an outwardly-extending annular flange 38. The housing 14 is rotatably suspended in the fixed housing 12 on bearings 40 mounted in race 34. The diagonal mirror 16 is mounted in a search head 41 including a three-sided hood 42 which is connected to an edge of the open top 32 by means of a flange 44 in such a manner that the diagonal mirror 16 slopes upwardly and inwardly over the open top 32. The open side of head 42 is closed by means of a flange 46 having an apertured window 48 through which target energy may pass to be reflected by diagonal mirror 16 onto a spherical mirror 50 supported on an annular, flanged plate 52 which is sealed to flange 38.

A flexible seal 54 is attached to the base of search head 41 to form a wiping contact with the flanged open top 24 of housing 12 to protect bearings 40.

A support member 56 includes spaced, parallel rails 58 and 60, respectively, which are attached to housing 14 at its open end 32. First and second conduits 62 and 64 are mounted in parallel, spaced relation between the rails 58 and 60 and have their ends rigidly affixed thereto. The array of detector cells 18 and the reticle 17 are mounted in the open top 32 on the underside of conduits 62 and 64. The amplifiers 20 include a first bank 70 which is suspended from the rail 58 and depends into the housing 14 and a second bank 72 which is suspended from the rail 60 and depends into the housing 14. Detector cells 74, 75, 76, 77 and 78 from array 18 are connected to amplifiers 80, 81, 82, 83 and 84, respectively, of bank 70 through suitable electrical leads, not shown, which may pass through conduit 64. Detector cells 90, 91, 92, 93 and 94 of the array 18 are connected to amplifiers 95, 96, 97, 98 and 99, respectively, of the bank 72, through suitable electrical leads, not shown, which may pass through conduit 62.

The annular plate 52 carries a hollow hub 105 to which a gear 106 is rigidly connected. An annular plate 108 is rigidly affixed to the encompassing sidewall 26 and includes a journal 110 in which the hub 105 is rotatably mounted on bearings 112. An electric motor 114 is mounted on the plate 108 and includes a shaft 116 to which a pinnion 118 is keyed. The motor 114 drives gear 106 through pinnion 118 to rotate the rotatable housing 14 during system operation. Electrical power is supplied to the motor 114 through a conduit 120 which also carries power to fixed contacts 121, 122 and 123, respectively. The contacts 121, 122 and 123 are mounted on plate 108 to form a wiping connection with slipring contacts 124, 125 and 126, respectively, which are affixed to the underside of gear 106. Electrical leads 127, 128 and 129 carry power from the slipring contacts 124, 125 and 126, respectively, to a power rectifier 130 which is doughnut shaped to encompass hub 105 and which is attached to flanges 132 formed on the underside of plate 52.

An electrical conduit 134 connects rectifier 130 with amplifiers 80, 81, 82, 83 and of bank 70 through leads 135, 136, 137, 138 and 140, respectively and to the amplifiers 95, 96, 97, 98 and 99 of bank 72 through suitable leads, not shown. An electrical conduit 142 is connected to rectifier 130, passes through hollow hub 105 and includes leads 143 which are connected to a plurality of styli 148. The styli 148 are affixed to the underside of a disc 152 and are positioned radially from hub 105 in such a manner that a particular stylus will be indicative of a particular elevational angle. The disc 152 is connected to hub 105 for rotation therewith.

Referring to FIGURE, 4 the styli 148 each comprise a clapper-type solenoid having a coil 156 connected to a lead 143, a bracket 158 to which a bar 160 is pivotally connected, a core 162 and a steel, marking scribe 164. The bar 160 is biased in an upward direction by means of a spring 166.

Referring to FIGURE 1, a pressure sensitive paper 168 is mounted on a dispensing roll 170 subjacent the styli 148 for receiving marks therefrom and passes over a transparent plate 172 to a receiving roll 174. A ratchet mechanism 176 may be employed to activate the receiving roll 174 to advance the pressure sensitive paper 168 across plate 172 as desired by the operator. A transparent, graduated window 178 (FIGURE 3) is mounted subjacent the plate 172 superjacent an opening 180 in bottom wall 28. The window 178 is marked to indicate north, each, south and west in azimuth and with concentric circles 182, 183, 184, 185 and 186 which represents 0–20°, respectively, in elevation.

The rectifier 130 is cooled by air entering housing 12 through a filter 188, a blower 190, and an aperture 192 in plate 108. After the air has circulated past and around rectifier 130, it leaves housing 12 through an aperture 194 mounted in wall 26.

A viewing mirror 196 is positioned subjacent the aperture 180 in such a manner that the information printed on paper 168 will be displayed on mirror 196.

Since target energy entering aperture 48 strikes mirror 16 and is reflected therefrom at a point determined by the elevation of the energy and the styli 148, which are activated by target energy, are positioned radially along disc 152 in such a manner that a particular stylus will be indicative of a predetermined elevation, the styli 148 will mark paper 168 in such a manner that, when a mark is reflected on mirror 196 through window 178, it will be positioned near one of the concentric circles 182–186 representing degrees elevation.

Target energy emanating from an elevation represented by broken line 198 strikes mirror 16 at a point identified by the numeral 200 and is reflected along broken line 202 onto spherical mirror 50 from which it is reflected onto detector cell 94 in array 18. Target energy emanating from an elevation represented by the broken line 204 strikes the mirror 16 at a point identified by the numeral 206 and is reflected onto spherical mirror 50 from which it is reflected onto cell 90. Target energy emanating from an elevation represented by broken line 208 strikes mirror 16 at a point represented by numeral 210 from which it is reflected onto spherical mirror 50 which reflects the target energy onto detector cell 74 in array 18.

Operation of the device will be readily understood. Assuming that as the search head is rotated it sweeps past a particular target energy source which emanates from the north in azimuth and from an elevator identified by the broken line 204 and strikes mirror 16 at point 206 from which it is reflected onto spherical mirror 50. The target energy is then reflected through reticle 17 to detector cell 90. Reticle 17 modulates the target energy in such a manner that detector cell 90 will emit a signal which is transmitted to amplifier 95, the duration of the signal being a direct function of the particular reticle configuration. The amplifier 95 amplifies the signal and transmits it through conduit 134 to rectifier 130. Rectifier 130 transmits the signal through one of the leads 143 to the center stylus 148a, magnetizing its core 162 through a coil 156, causing the associated scribe 164 to contact paper 168 and place a mark 197 (FIGURE 3, as seen through the paper 168, the transparent plate 172 and the window 178. The length of such mark is determined by the duration of the detected signal and the rotational speed of the search head) thereon. The operator of the device then views mirror 196 which reflects the mark 197 through graduated window 178. The window 178 superimposes concentric circles 182–186 on the image in mirror 196 and the mark 197 is seen to be located on the north line midway between the center of window 178 and circle 186 indicating that the target has an elevational angle of approximately 11°.

Should other energy sources be within the field of scan of the search head as it rotates various other marks are similarly imprinted upon the contact paper 168 by the same or others of the styli, dependent upon the elevation and azimuth of the target. These marks appear as being disposed about the common center of the concentric circles when observed through the mirror 196 in accordance with the target positions. A new mark is made by a stylus as representative of each target upon each rotation of the scanning head for so long as the target remains within the field of view of the search head. The parameters of the target, such as speed, direction of travel, etc., may then be determined by conventional calculation techniques as a result of the relative changes in positions of the various marks.

While the particular infrared search device herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. An infrared search device comprising:
   (a) a rotatable housing;
   (b) a diagonal mirror positioned in said housing to reflect target energy received from a source, said target energy being reflected at different angles of reflection for different elevational angles within a predetermined elevational sector;
   (c) infrared target receiving means including a plurality of infrared detector cells mounted in said housing subjacent said diagonal mirror in such a manner that each cell is activated by target energy having a predetermined angle of reflection, each said cell emitting an electrical signal when activated by said target energy for indicating the elevation of infrared target energy received from said source within said elevational sector;
   (d) elevation read-out means connected to said housing for rotation therewith through 360° in azimuth and including means for providing discrete indications of target orientation and an electrically activated marking device connected in said circuit to each said cell for activation by said electrical signals, each said marking device being positioned radially from the center of rotation of said housing a predetermined amount which is indicative of the angle of reflection activating the cell connected to its associated marking device;
   (e) electrical circuitry connecting said read-out means to said infrared target energy receiving means; and
   (f) means positioned adjacent said marking devices for receiving a mark when a marking device is activated by its cell.

2. An infrared search device comprising:
   (a) a continuously rotatable housing having a search head for intercepting infrared target energy originating from a predetermined elevational sector;
   (b) infrared dectector means mounted in said housing for receiving target energy intercepted by said search head, said detector means emitting a different electrical signal when target energy is received from different elevations;
   (c) marking means connected to said housing for rotation therewith through 360° in azimuth comprising discrete marking heads adapted for selective intermittent operation responsive to said electrical signals; and
   (d) mark receiving means fixedly mounted with respect to marking means for receiving marks therefrom indicative of the elevation of said target energy.

3. The device of claim 2 wherein said marking heads comprise a plurality of styli position with respect to said mark receiving means in such a manner that each stylus will place a mark on said mark receiving means corresponding to a predetermined elevational angle when actuated by said electrical signals.

4. The device of claim 2 wherein said infrared detector means includes a plurality of cells, each said cell receiving target energy from a predetermined elevational angle and said marking heads includes a plurality of styli corresponding in number to said cells, each said stylus being arranged radially with respect to the center of rotation of said housing in such a manner that a mark made by a particular stylus from a signal received from its corresponding cell will be positioned on said mark receiving means at a predetermined location representing the elevational angle of the target energy received by said corresponding cell.

5. An infrared search device comprising:
   (a) a fixed housing having an open top;
   (b) a rotatable housing rotatably mounted in said fixed housing and having a search head extending from said open top for receiving infrared target energy while rotating through 360° in azimuth;
   (c) a diagonal mirror and an aperture window mounted in said search head, said diagonal mirror receiving said target energy and reflecting it into said rotatable housing;
   (d) a spherical mirror mounted in said rotatable housing subjacent said diagonal mirror for receiving target energy reflected therefrom;
   (e) an array of infrared detector cells mounted in said rotatable housing intermediate said diagonal mirror and said spherical mirror for receiving target energy reflected therefrom, each cell receiving energy from a predetermined elevation and emitting an electric signal when activated by said target energy;
   (f) a reticle mounted subjacent said detector cells for modulating target energy received from said spherical mirror;
   (g) an amplifier electrically connected to each detector cell for amplifying signals received therefrom;
   (h) a gear rigidly affixed to said rotatable housing for rotating said housing through 360° in azimuth;
   (i) means mounted in said fixed housing in driving engagement with said gear;
   (j) an arm rigidly connected to said rotatable housing for rotation therewith, said arm extending radially from the center of rotation of said rotatable housing;
   (k) a stylus for each cell positioned along said arm and depending therefrom, the position of each stylus corresponding to the elevation of the target energy received by its corresponding cell;
   (l) electrical circuit means connecting each stylus to its cell through a predetermined amplifier to activate each stylus in accordance with a predetermined pattern based on the elevation of target energy signals amplified by said predetermined amplifier;
   (m) a pressure sensitive paper mounted in said fixed housing subjacent said styli for receiving a mark when a stylus is activated;
   (n) a graduated window mounted subjacent said paper for reflecting degrees elevation and degrees in azimuth onto said paper; and
   (o) a viewing mirror mounted subjacent said graduated window for viewing marks placed on said paper by said styli through said graduated window.

References Cited by the Examiner

UNITED STATES PATENTS

| | | | |
|---|---|---|---|
| 2,066,262 | 12/1936 | Finch | 346—77 |
| 2,838,678 | 6/1958 | Beese | 250—83.3 |
| 2,914,609 | 11/1959 | Blackstone | 346—146 |
| 2,921,757 | 1/1960 | Houle | 88—1 |
| 2,972,741 | 2/1961 | Hammond | 346—8 |
| 2,979,714 | 4/1961 | Wallace | 346—8 |
| 3,022,374 | 2/1962 | Brattain et al. | 346—146 |
| 3,087,062 | 4/1963 | Clark | 250—83.3 |

LEO SMILOW, *Primary Examiner.*

ROBERT L. EVANS, *Examiner.*